US012640554B2

(12) United States Patent
Burke et al.

(10) Patent No.: US 12,640,554 B2
(45) Date of Patent: May 26, 2026

(54) PROTECTING CIRCUIT FOR BATTERY DURING ENGINE STARTING EVENTS

(71) Applicant: KOLD-BAN INTERNATIONAL, LTD., Lake in the Hills, IL (US)

(72) Inventors: James O. Burke, Richmond, IL (US); Dean R. Solberg, Burlington, WI (US)

(73) Assignee: KOLD-BAN INTERNATIONAL, LTD., Lake in the Hills, IL (US)

( * ) Notice: Subject to any disclaimer, the term of this patent is extended or adjusted under 35 U.S.C. 154(b) by 202 days.

(21) Appl. No.: 18/639,325

(22) Filed: Apr. 18, 2024

(65) Prior Publication Data

US 2024/0291265 A1      Aug. 29, 2024

Related U.S. Application Data

(63) Continuation-in-part of application No. 18/441,168, filed on Feb. 14, 2024.

(60) Provisional application No. 63/447,998, filed on Feb. 24, 2023.

(51) Int. Cl.
*H02H 7/18* (2006.01)

(52) U.S. Cl.
CPC ..................................... *H02H 7/18* (2013.01)

(58) Field of Classification Search
CPC ....................................................... H02H 7/18
See application file for complete search history.

(56) References Cited

U.S. PATENT DOCUMENTS

| | | | |
|---|---|---|---|
| 6,545,445 B1 * | 4/2003 | McDermott | ........ F02N 11/0866 |
| | | | 320/103 |
| 7,608,940 B2 * | 10/2009 | Osawa | ...................... H02J 7/60 |
| | | | 361/33 |
| 8,004,109 B2 * | 8/2011 | Komatsu | ............. H02M 5/4585 |
| | | | 307/115 |
| 8,415,905 B2 | 4/2013 | Sean et al. | |
| 9,431,850 B2 | 8/2016 | Imai et al. | |
| 9,738,174 B2 | 8/2017 | Gu | |
| 9,917,460 B2 | 3/2018 | Koenen et al. | |
| 10,119,514 B2 | 11/2018 | Averbukh et al. | |
| 10,131,298 B2 | 11/2018 | Boucharel et al. | |
| 10,174,736 B2 * | 1/2019 | Zhang | ..................... H02J 7/345 |
| 10,305,295 B2 | 5/2019 | Kelly-Morgan et al. | |

(Continued)

FOREIGN PATENT DOCUMENTS

| | | | |
|---|---|---|---|
| WO | WO2012074548 A1 | 6/2012 | |
| WO | WO2015195321 A1 | 12/2015 | |

*Primary Examiner* — Dharti H Patel
(74) *Attorney, Agent, or Firm* — Benesch Friedlander Coplan & Aronoff LLP

(57) ABSTRACT

The disclosure is directed to systems and methods for providing a battery protection circuit during an engine starting event on a vessel. The system includes a first relay, wherein the first relay electrically connects between: a first battery, and a starter motor and a set of on-board accessories, the starter motor mechanically associated with an engine; a battery protection circuit, wherein the battery protection circuit comprises a second relay and a current-limiting circuit in parallel, and electrically connects between: a second battery, and the starter motor and the set of on-board accessories; and a controller, wherein upon receiving a signal to start the engine, the controller is configured to send a first control signal to the first relay and a second control signal to the second relay.

21 Claims, 6 Drawing Sheets

100

(56) References Cited

U.S. PATENT DOCUMENTS

| | | | |
|---|---|---|---|
| 2002/0152981 A1* | 10/2002 | Goetze | H02J 7/575 |
| | | | 290/31 |
| 2006/0087280 A1* | 4/2006 | Miyashita | F02N 11/08 |
| | | | 320/104 |
| 2008/0113226 A1 | 5/2008 | Dasgupta et al. | |
| 2011/0001352 A1 | 1/2011 | Tamura et al. | |
| 2013/0266826 A1* | 10/2013 | Cowperthwaite | H01M 50/209 |
| | | | 29/25.42 |
| 2014/0103722 A1* | 4/2014 | Namuduri | H02J 7/1423 |
| | | | 307/38 |
| 2015/0072209 A1 | 3/2015 | Tyler et al. | |
| 2018/0309284 A1* | 10/2018 | Arendell | H02H 7/18 |
| 2020/0072177 A1 | 3/2020 | Clarke et al. | |
| 2020/0144851 A1* | 5/2020 | Delevski | H02J 7/1423 |
| 2020/0370527 A1* | 11/2020 | Sturtevent | F02N 11/0803 |
| 2021/0021139 A1* | 1/2021 | Windsor | B60K 1/04 |
| 2021/0206275 A1* | 7/2021 | Mahmoud | F02N 11/0866 |
| 2022/0145842 A1* | 5/2022 | Burke | F02N 11/0866 |
| 2022/0355704 A1* | 11/2022 | Carlson | B60L 58/19 |
| 2023/0378752 A1* | 11/2023 | Chen | H02J 1/122 |
| 2024/0291265 A1* | 8/2024 | Burke | H02H 7/18 |
| 2024/0291296 A1* | 8/2024 | Burke | H02J 7/63 |

* cited by examiner

100
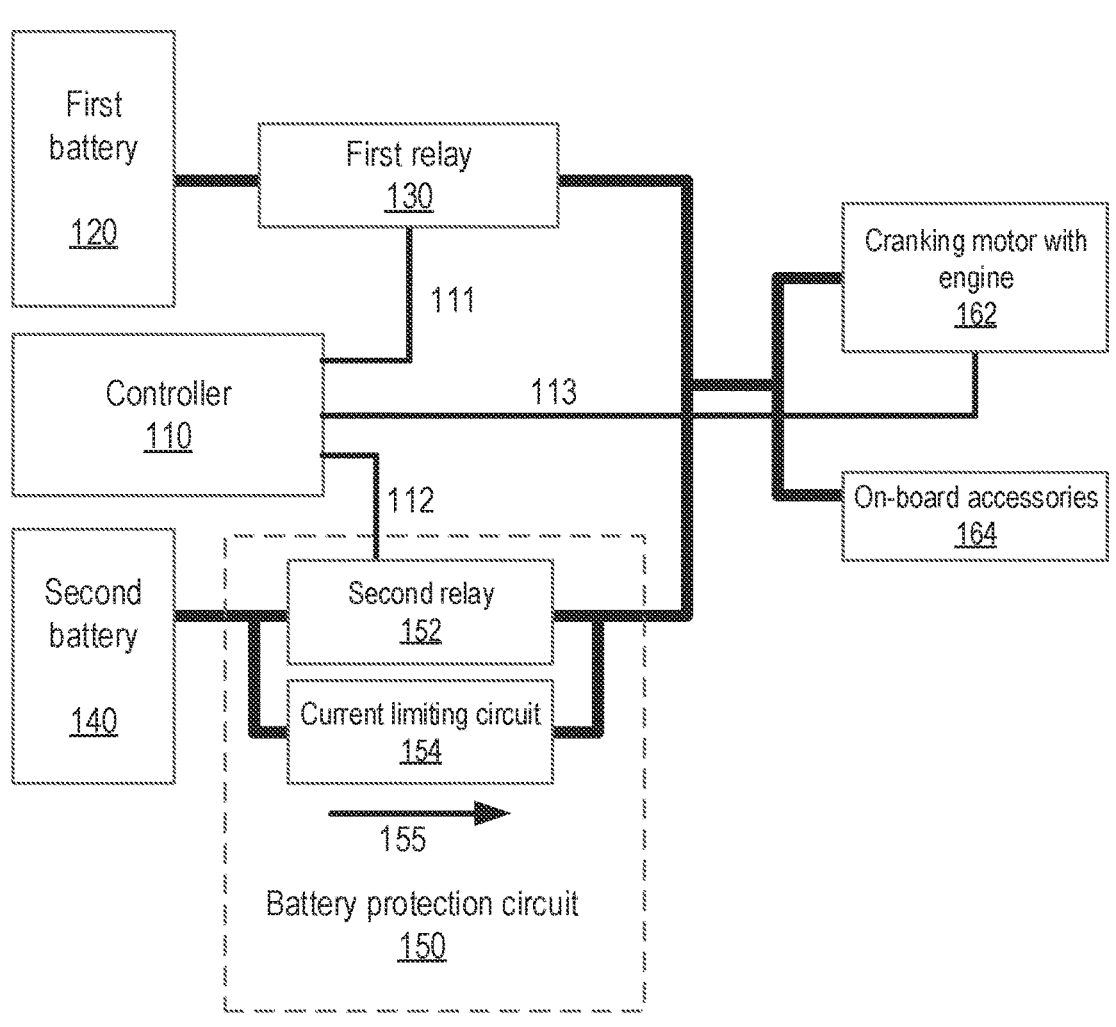
FIG. 1 setting a first relay to electrically connect between: a first battery, and a starter motor and a set of on-board accessories, the starter motor mechanically associated with an engine.

310 setting a battery protection circuit to electrically connect between: a second battery, and the starter motor and the set of on-board accessories, wherein the battery protection circuit comprises a second relay and a current-limiting circuit in parallel.

320 setting a controller to electrically connect with the first relay and the second relay, wherein upon receiving a signal to start the engine, the controller is configured to send a first control signal to the first relay and a second control signal to the second relay

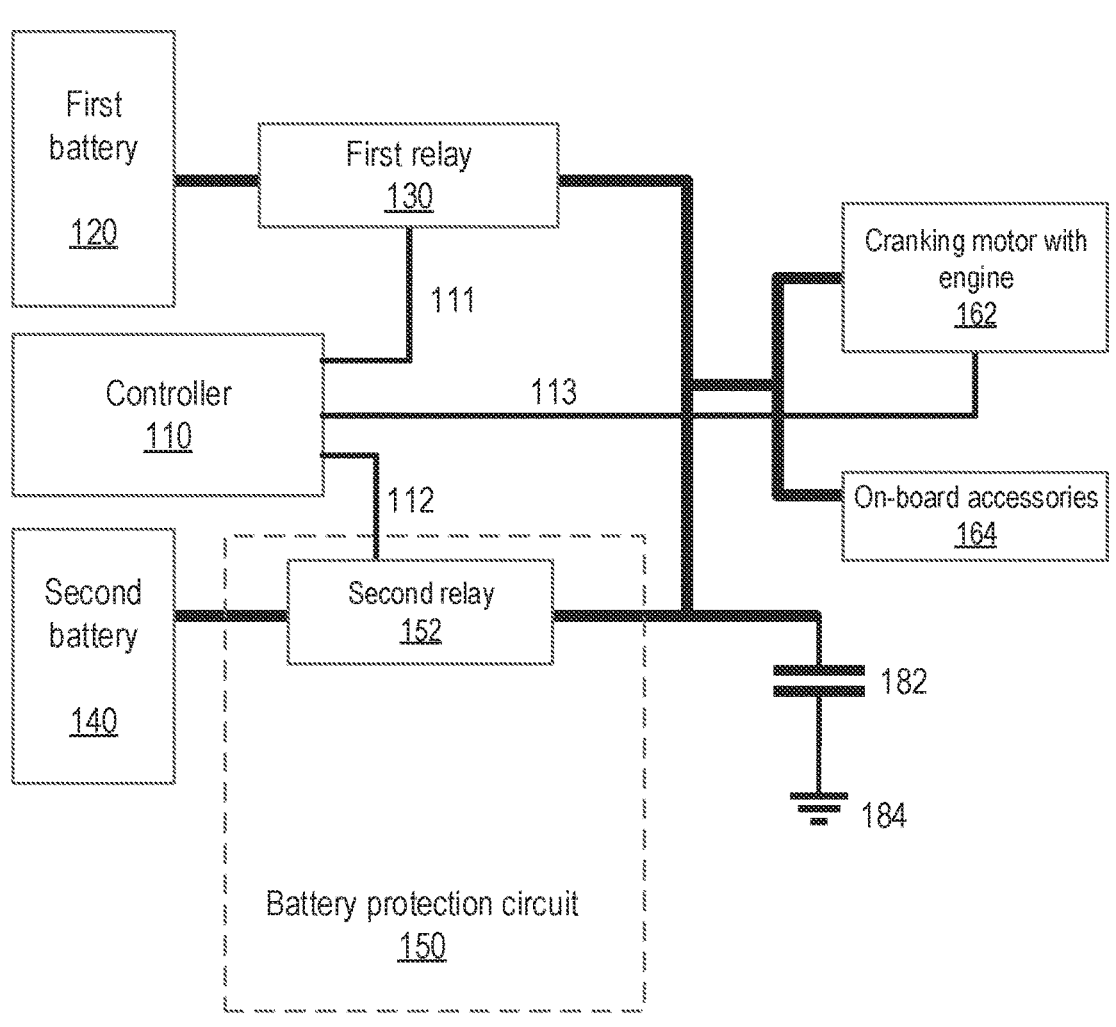
FIG. 4A

100
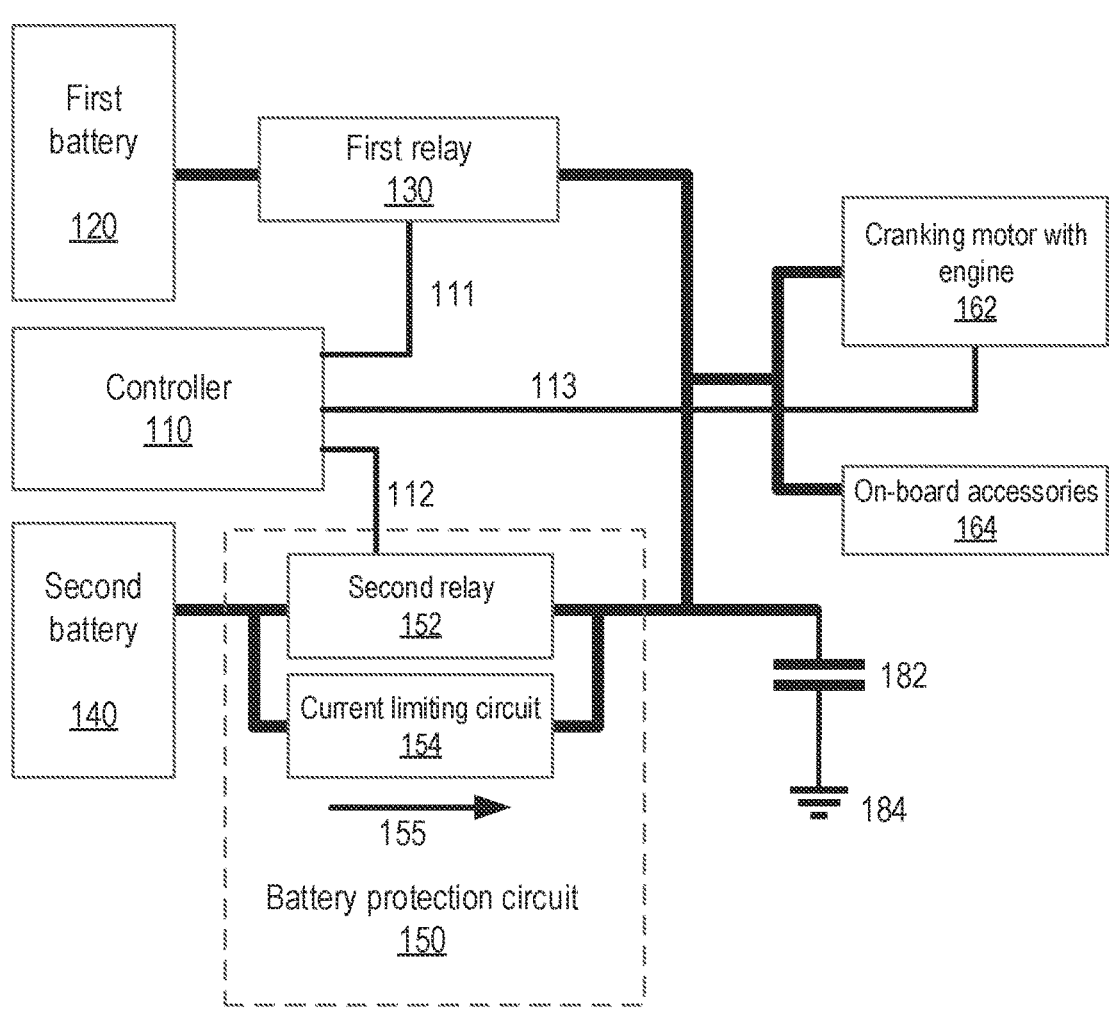
FIG. 4B

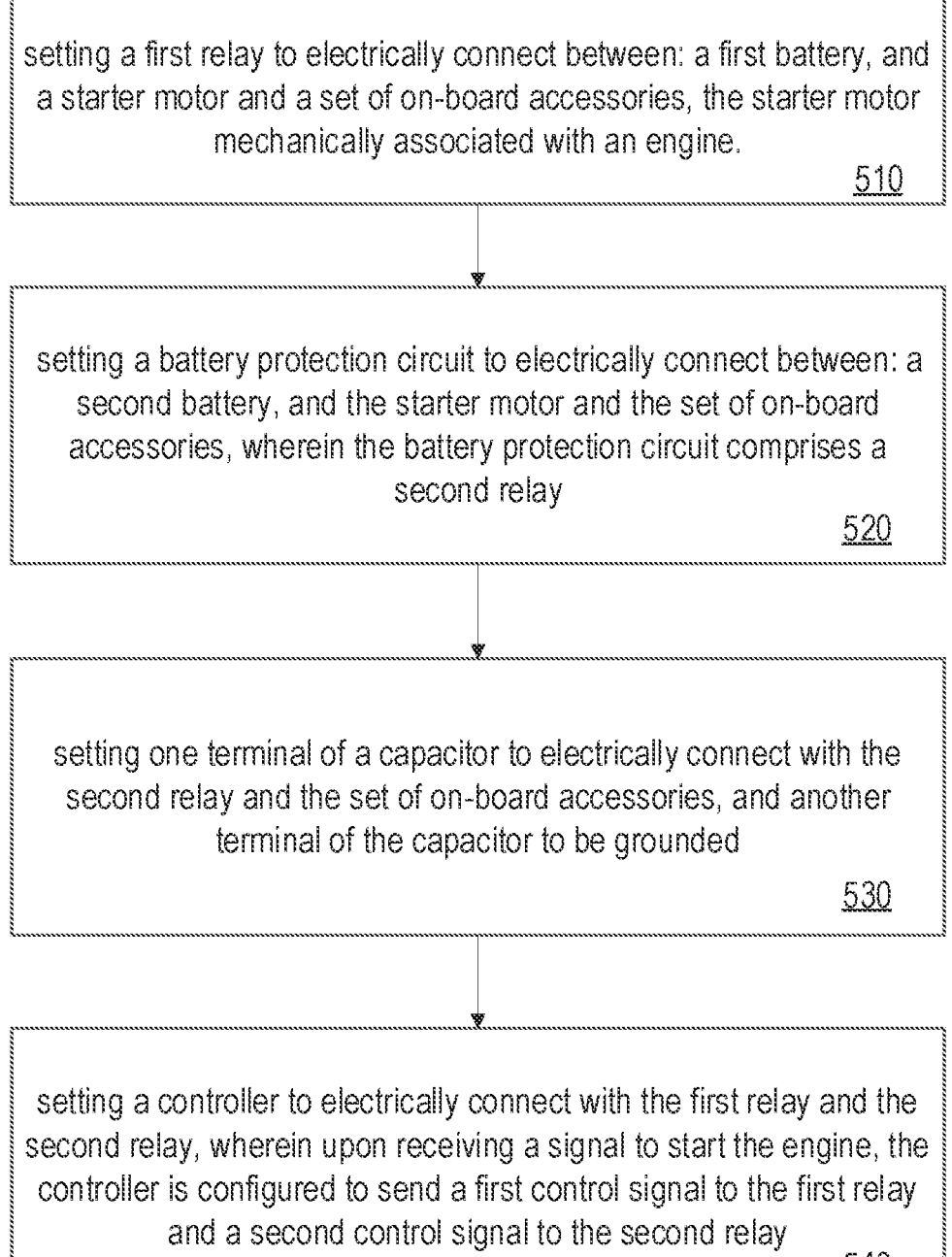

setting a first relay to electrically connect between: a first battery, and a starter motor and a set of on-board accessories, the starter motor mechanically associated with an engine.

510 setting a battery protection circuit to electrically connect between: a second battery, and the starter motor and the set of on-board accessories, wherein the battery protection circuit comprises a second relay

520 setting one terminal of a capacitor to electrically connect with the second relay and the set of on-board accessories, and another terminal of the capacitor to be grounded

530 setting a controller to electrically connect with the first relay and the second relay, wherein upon receiving a signal to start the engine, the controller is configured to send a first control signal to the first relay and a second control signal to the second relay

PROTECTING CIRCUIT FOR BATTERY DURING ENGINE STARTING EVENTS

INCORPORATION BY REFERENCE

This application is a continuation-in-part application based on and claims the benefit of priority to U.S. non-Provisional application Ser. No. 18/441,168 filed on Feb. 14, 2024, which is based on and claims the benefit of priority to U.S. Provisional Application No. 63/447,998 filed on Feb. 24, 2023, both of which are herein incorporated by reference in their entireties.

BACKGROUND

1. Technical Field

This disclosure relates to a protecting circuit in vehicles or vessels of the type that include one or more internal combustion engines, one or more cranking motors, one battery normally used to power the cranking motor, and another battery normally used to power on-board accessories. In particularly, this disclosure relates to improvements to such system that protect batteries during engine starting events, thus increasing reliability, lifetime, and safety of engine starting systems.

2. Background Information

With the development of batteries, new types of batteries, e.g., lithium-based rechargeable batteries or hydrogen-fuel cells, have been widely used in from portable devices to vehicles/vessels/airplanes. For example, some lithium-based battery may be used as primary batteries in vehicles or vessels.

In vehicles or vessels, during engine starting events, a starter motor needs a large current from a battery source to crank an engine. A secondary (or supplementary) battery, which can provide a large current, may provide the required electric current for the starter motor to start the engine. There are some issues/problems associated with some engine starting systems.

The present disclosure describes various embodiments for protecting one or more batteries from over-discharging during engine starting events and continuously providing power to on-board accessories without interruption, thus addressing at least one of the issues/problems in the technology field and improving the present technology field.

The present disclosure describes various embodiments for, during engine starting events, protecting and continuously providing power to on-board accessories without interruption, thus addressing at least one of the issues/problems in the technology field and improving the present technology field.

BRIEF SUMMARY

The present disclosure describes a system for providing a battery protection circuit during an engine starting event on a vessel. The system includes a first relay, wherein the first relay electrically connects between: a first battery, and a starter motor and a set of on-board accessories, the starter motor mechanically associated with an engine; a battery protection circuit, wherein the battery protection circuit comprises a second relay and a current-limiting circuit in parallel, and electrically connects between: a second battery, and the starter motor and the set of on-board accessories; and a controller, wherein upon receiving a signal to start the engine, the controller is configured to send a first control signal to the first relay and a second control signal to the second relay.

The present disclosure is also directed to a system for starting an engine in vessel. The system includes: a first battery; a second battery; a first relay, wherein the first relay electrically connects between: the first battery, and a starter motor and a set of on-board accessories, the starter motor mechanically associated with an engine; a battery protection circuit, wherein the battery protection circuit comprises a second relay and a current-limiting circuit in parallel, and electrically connects between: the second battery, and the starter motor and the set of on-board accessories; and a controller, wherein upon receiving a signal to start the engine, the controller is configured to send a first control signal to the first relay and a second control signal to the second relay.

The present disclosure describes a method of manufacturing a battery protection circuit, the method comprising: setting a first relay to electrically connect between: a first battery, and a starter motor and a set of on-board accessories, the starter motor mechanically associated with an engine; setting a battery protection circuit to electrically connect between: a second battery, and the starter motor and the set of on-board accessories, wherein the battery protection circuit comprises a second relay and a current-limiting circuit in parallel; and setting a controller to electrically connect with the first relay and the second relay, wherein upon receiving a signal to start the engine, the controller is configured to send a first control signal to the first relay and a second control signal to the second relay.

The present disclosure describes another system for providing a protection circuit during an engine starting event, the system comprising: a first relay, wherein the first relay electrically connects between: a first battery, and a starter motor and a set of on-board accessories, the starter motor mechanically associated with an engine; a battery protection circuit, wherein the battery protection circuit comprises a second relay, and electrically connects between: a second battery, and the starter motor and the set of on-board accessories; a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay.

The present disclosure is directed to another system for starting an engine. The system includes: a first battery; a second battery; a first relay, wherein the first relay electrically connects between: the first battery, and a starter motor and a set of on-board accessories, the starter motor mechanically associated with an engine; a battery protection circuit, wherein the battery protection circuit comprises a second relay, and electrically connects between: the second battery, and the starter motor and the set of on-board accessories; and a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay.

The present disclosure describes another method of manufacturing a circuit, the method comprising: setting a first relay to electrically connect between: a first battery, and a starter motor and a set of on-board accessories, the starter motor mechanically associated with an engine; setting a battery protection circuit to electrically connect between: a second battery, and the starter motor and the set of on-board accessories, wherein the battery protection circuit comprises a second relay; setting one terminal of a capacitor to electrically connect with the second relay and the set of on-board accessories, and another terminal of the capacitor to be grounded; and setting a controller to electrically connect with the first relay and the second relay, wherein upon receiving a signal to start the engine, the controller is configured to send a first control signal to the first relay and a second control signal to the second relay.

BRIEF DESCRIPTION OF THE DRAWINGS

FIG. 1 is a schematic diagram of an embodiment for providing a battery protection circuit during an engine starting event.

FIG. 3 is a flow diagram of a method for manufacturing a battery protection circuit in the present disclosure.

FIG. 4A is a schematic diagram of another embodiment in the present disclosure.

FIG. 4B is a schematic diagram of another embodiment in the present disclosure.

FIG. 5 is a flow diagram of another method for manufacturing a circuit in the present disclosure.

DETAILED DESCRIPTION

Figure 2:
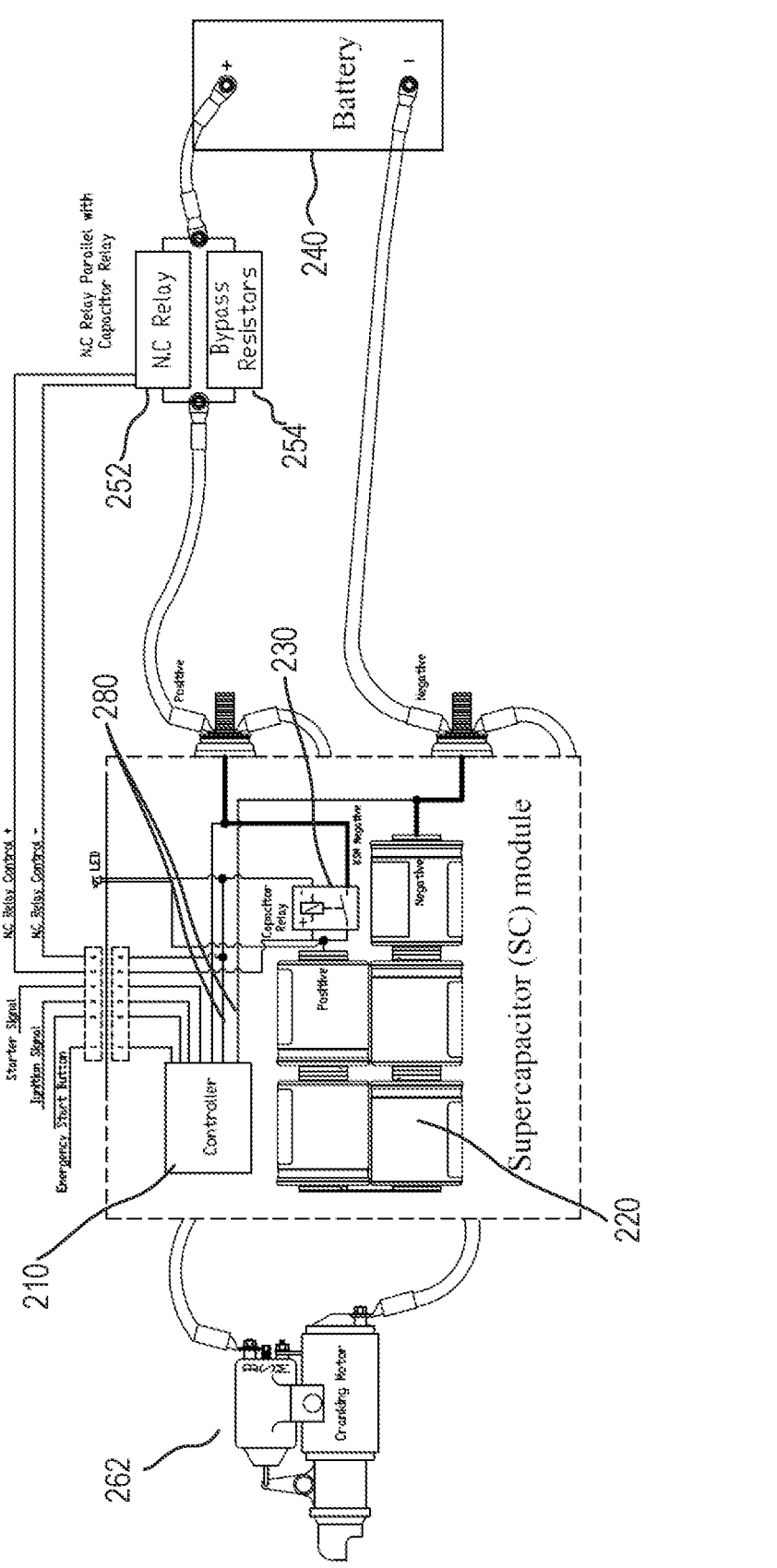
FIG. 2 is a schematic diagram of another embodiment for starting one or more cranking motors.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below. Please also note that the present disclosure may be embodied as methods, devices, components, or systems. Accordingly, embodiments of the present disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various embodiments for protecting one or more batteries during engine starting events in some applications, for example but not limited to, a vehicle or a vessel in marine applications with one or more engines.

During an engine starting events in a vehicle or a vessel, a dedicated battery (for example, a supercapacitor battery) may be connected to a starter motor, and power the starter motor (or called as cranking motor) to start (or called as "boost", "jump", or "jump-start") an engine operatively. The dedicated battery may be a separate battery/device from a primary battery in the vehicle or the vessel. The primary battery may provide electric power to on-board accessories/devices.

The primary battery may have a certain nominal voltage, for example but not limited to, 6 Volts (V), 12V, 24V, 48V. In some implementations, the primary battery may be a lead-acid battery, including but not limited to, a traditional lead-acid battery, a sealed lead-acid (SLA) battery, an enhanced flooded battery (EFB), or an absorbent glass mat (AGM) battery. The EFB is wet-filled and may be similar to standard flooded batteries; and when compared to a traditional lead acid battery, the EFB may provide improved charge acceptance and greater cyclic durability. Thus, EFB may last longer than a traditional flooded battery. AGM batteries have thin fiberglass mats which are saturated in acid and soldered into place before being compressed between the lead plates, effectively holding the battery's electrolyte in place.

In some implementations, because of their advanced technology and benefits, other rechargeable batteries (e.g., lithium ion, lithium ion polymer, Nickel-Metal Hydride (NiMH), Nickel Cadmium (NiCd)) began to be used as the primary battery. Some benefits of lithium-based batteries (lithium cells) include substantially much better energy density than a lead-acid cell, so that for equal power capacity, lithium-based batteries have less weight and less size. Lithium cells also have a much longer lifetime than a lead-acid cell in term of charge-discharge cycles; and are maintenance free, whereas lead-acid cells may need to be refilled with distilled water to maintain the acid level above the plates.

The primary battery may have certain limitations on its output current, which may include at least one of the following: optimal discharge current, maximum continuous discharge current, maximum pulse discharge current, etc. For example, for a type of lithium rechargeable batteries, it may have an optimal discharge current of 40 Amps (A), a maximum continuous discharge current of 80 A, and a maximum pulse discharge current of 100 A. Over-discharging the lithium rechargeable batteries may lead to serious issues, for example, overheating, battery degradation, damaging the batteries, and/or shortening lifetime.

There may be some issues/problems with some designs for some starting systems, wherein both the primary battery (e.g., an AGM battery or a lithium battery) and a supplementary battery (e.g., a supercapacitor battery) directly connect to the cranking motor and the on-board accessories during an engine starting event. In these situations, the discharge current from the primary battery may be over its maximum discharge current, which may damage the primary battery and/or result in safety hazards. For example, the discharge current from the lithium battery with a maximum pulse discharge current of 80 Amps may transitionally increase to over 400 Amps during the engine starting event.

To eliminate over-discharging the primary battery during engine starting events, some implementations may completely switch off the primary battery from the starter motor and the on-board accessories, resulting in other issues/ problems. One issue/problem may be that the on-board accessories may momentarily lose electric power during a transition period during the engine starting events. For example, when an AGM battery or a lithium battery serves as the primary battery and a supercapacitor battery as the supplementary battery for provides power to the starter motor, at the beginning of an engine starting event, the on-board accessories may lose electric power during the transition period when the AGM battery or the lithium battery is switched off and the supercapacitor battery is switched on. For another example, during engine starting events, the voltage of the supercapacitor keeps dropping while the supercapacitor is discharging to provide power to the cranking motor, and the lowered voltage of the supercapacitor may be insufficient to provide electric power to on-board accessories, resulting in the on-board accessories losing electric power, which lead to inconvenience and/or unsafe situations.

The present disclosure describes various embodiments for protecting one or more batteries from over-discharging during engine starting events, and continuously providing power to on-board accessories without interruption. The various embodiments address at least one of the issues/ problems described above, increasing the lifetime of the battery and leading to a safer and more reliable engine starting system.

In one embodiment as shown in FIG. 1, a system 100 may be used to protect a second battery (140) when a first battery (120) powers a cranking motor (162) during an engine starting event. The system 100 may include a portion or all of the following: a first relay (130), a battery protection circuit (150) including a second relay (152) and a current limiting circuit (154) in parallel, and/or a controller (110). The second battery (140) may primarily provide power to on-board accessories (164) via the battery protection circuit (150); and the first battery (120) may primarily provide power to the cranking motor via the first relay (130). Each of the first relay and the second relay may include one or more input terminals, one or more output terminals, and one control terminal. The thinner lines may represent control signals with small current (e.g., a few Amps or less) and the thicker lines may represent electric power flow with large current (e.g., tens/hundreds Amps or larger).

In various embodiments, the first battery may include one or more capacitors or any other type of devices to store energy. In some implementations, the capacitor may include one or more supercapacitor, one or more double layer capacitor, or electrochemical capacitor. In some implementations, the stored energy capacity may be from 15 kilojoule (kJ) to 150 kJ, an internal resistance may be from 0.0005 Ohms to 0.006 Ohms, and a maximum voltage may be from 10 Volts (V) to 50 V. For one non-limiting example, the capacitor may have a capacitance of 240 farads, a stored energy capacity of 19.4 kilojoules, and an internal resistance of 0.0026 ohms. For another non-limiting example, the capacitor may have a capacitance of 500 farads, a stored energy capacity of 122.48 kilojoules, and an internal resistance of 0.0019 ohms. For another non-limiting example, the capacitor may have a capacitance of 315 farads, a stored energy capacity of 120 kilojoules, and an internal resistance at 25 degrees Celsius of 0.006 ohms. For another non-limiting example, the capacitor may have a capacitance of 240 farads, a stored energy capacity of 27 kilojoules. Such capacitors provide the advantage of delivering high currents at low temperatures and relatively low voltages because of their low internal resistance. The first battery may include one or more batteries (or battery cells) as a battery pack, and is not be limited to a single battery or single battery cell.

Though not shown in FIG. 1, the electrical system of the vehicle or vessel may, for example but not limited to, include a circuit to charge the first battery. The charging process of the first battery may be monitored and/or regulated by a control unit, which may be a portion of the controller 110 or a separate controller. In one implementation, the control unit may include a programmable logic controller (PLC) or microprocessor based charge controller (MCC). In another implementation, the control unit may communicate with other components inside the electrical system, and/or may communicate with the cranking motors and engines.

In various embodiments, the second battery may include one or more rechargeable batteries (e.g., lead-acid, EFB, AGM, lithium ion, lithium ion polymer, Nickel-Metal Hydride (NiMH), Nickel Cadmium (NiCd)), or one or more hydrogen-fuel cell. In some implementations, the second battery may be a rechargeable lithium battery for outputting a direct current (DC) voltage. The lithium battery may include batteries based on lithium iron phosphate, lithium-cobalt oxide, or any lithium based materials. The second battery may include one or more batteries (or battery cells) as a battery pack, and is not limited to a single battery or single battery cell. For example, lithium iron phosphate batteries typically have a nominal cell voltage of about 3.2V each, and thus, multiple lithium cells may be connected in series to achieve a desired nominal voltage.

For one non-limiting example, the second battery may include a lithium battery pack having a nominal voltage of 12.8 Volts with a stored-energy capacity of 120 Amp-hours (Ah); and the lithium battery pack may have an optimal discharge current of 60 Amp and maximum pulse discharge current of 150 Amp. For another non-limiting example, the second battery may include a lithium battery pack having a nominal voltage of 12.8 Volts with a stored-energy capacity of 96 Amp-hours (Ah); and the lithium battery pack may have an optimal discharge current of 48 Amp and maximum pulse discharge current of 120 Amp.

Though not shown in FIG. 1, the electrical system of the vehicle or vessel may, for example but not limited to, include a generator or alternator driven by the engine when running to charge the AGM battery or the lithium battery. The charging process may be monitored and/or regulated by a control unit, which may be a portion of the controller (110) or a separate controller. The control unit may include a programmable logic controller (PLC) or microprocessor based charge controller (MCC).

Referring to FIG. 1, the first relay (130) may be a normally open relay. The first relay is normally in an open state (i.e., electrically non-conductive state). During the engine start event, the controller (110) receives a starting signal and sends a first control signal (111); and upon receiving a first control signal (111) from the controller (110), the first relay is switched from the open state to a closed state (i.e., from the electrically non-conductive state to electrically conductive state), so that the first battery provides electric power to start the cranking motor. For non-limiting examples, the first control signal may be a positive electric signal, for example a high voltage: when the first control signal is high voltage (for example, equal to or larger than 10 Volts or 12 Volts), the first relay is in the closed state; and when the first control signal is a zero voltage or a low voltage (for example, less than 2 Volts, 4 Volts, or 6 Volts), the first relay is in the open state.

Referring to FIG. 1, the battery protection circuit (150) may protect the second battery by limiting a discharging current from the second battery and also continuously provide power to the load without interruption. The battery protection circuit may include the second relay (152) and the current limiting circuit (154) being electrically in parallel, and is electrically disposed between the second battery and the load (e.g., on-board accessories (164)). Thus, when the second relay is in a closed state (i.e., connecting or conductive state), an electric current may pass through the second relay to power the load; and when the second relay is in an open state (i.e., disconnecting or non-conductive state), an electric current may pass through the current limiting circuit.

In some implementations, the on-board accessories may include but not limited to electric trolling motors, power pole anchor systems, live well pumps, power steering system, lighting systems, cooler or refrigeration systems, winches, horns, electronics as in navigation, instrumentation, engine & transmission engine control modules (ECMs), transponder fish-finders, and/or power source for portable electronic devices (e.g., phones, tablet computers, portable computers, etc.).

Referring to FIG. 1, the second relay (152) may be a normally closed relay. The second relay is normally in a closed state (i.e., electrically conductive state), so that the second battery provides electric power to power the on-board accessories without any restriction.

During the engine start event, the controller (110) receives the starting signal and sends a second control signal (112); and upon receiving the second control signal from the controller, the second relay is switched from the closed state to an open state (i.e., from the electrically conductive state to non-electrically conductive state). For non-limiting examples, the second control signal may be a positive electric signal, for example a high voltage: when the second control signal is high voltage (for example, larger than 10 Volts or 12 Volts), the second relay is in the open state; and when the second control signal is a zero voltage or a low voltage (for example, less than 2 Volts, 4 Volts, or 6 Volts), the second relay is in the closed state.

In some implementations, during the engine start event, when the controller (110) receives the starting signal, the controller may send the first control signal with high voltage and the second control signal with high voltage simultaneously, so as to switch the first relay and the second relay almost at the same time. After the engine starting event is over when the engine is started, the controller may send the first control signal with zero or low voltage; and send the second control signal with zero or low voltage. In some implementations, the first control signal and the second control signal may be a same signal to simplify circuit design.

In some implementations, during the engine start event, when the controller (110) receives the starting signal, the controller may send the first control signal and the second control signal sequentially (i.e., one after another). For example, based on the starting system, system configuration, and battery, the controller may send the first control signal and then send the second control signal; or the controller may send the second control signal and then send the first control signal.

In some implementations, after the engine is started, the controller may send the first control signal with zero or low voltage; and send the second control signal with zero or low voltage, simultaneously or sequentially.

In some implementations, during the engine start event, the controller (110) is capable of detecting the engine start event by monitoring a craning motor or an engine start circuit. In some implementations, the controller has a terminal to receive the starting signal, for example, the controller may receive a third control signal (113) from the cranking motor (162) or any part of the engine starting circuit. The third control signal may monitor a switch or relay corresponding to the cranking motor when the cranking motor is started.

Referring to FIG. 1, during an engine starting event, the current limiting circuit (154) may limit (or restrict) the current passing through the battery protection circuit (150) when the second relay is in the open state, so as to protect the second battery from over-discharging.

In some implementations, the current limiting/restriction circuit includes one or more resistor (called as by-pass resistor or current limit resistor). During engine starting events, the by-pass resistor allows the second battery (e.g., an AGM battery or a lithium battery pack) to provide power to on-board electronics via by-passing the second relay at an open state. After the engine is started, the second relay is back in its normally closed state, allowing the second battery (e.g., a lithium battery pack) to provide power to on-board electronics (by-passing the by-pass resistor). In some implementations, the current limiting/restriction circuit may be in series with one or more diode, and the diode may be connected in a certain polarity so that the diode allows electric current flowing along the direction indicated by an arrow 155 and blocks electric current flowing against the direction indicated by the arrow 155. Thus, during engine starting events, the diode can block electric current traveling from the first battery to the second battery. The diode may be various types of diode, for a non-limiting example, the diode may be a metal-semiconductor junction diode (e.g., a Schottky diode).

In some implementations, the resistance value (i.e., the size) of the by-pass resistor (or the resistance value of the set of by-pass resistors) depends on several factors, including the nominal voltage, the maximum continuous discharge current, and/or the maximum pulse discharge current of the second battery. The resistance value of the by-pass resistor may be in a range of 0.01~25 Ohm. For a non-limiting example, the by-pass resistor may be about 0.14 Ohm when the lithium battery pack has the normal voltage of about 14 Volts and the maximum pulse discharge current of 100 Amps.

When a relay is in an open state (electrically non-conductive state), there is very high or almost infinite resistance between the inputs and the outputs of the relay; and when the relay is in a closed state (electrically conductive state), there is very low or almost zero resistance between the inputs and the outputs of the relay.

In some implementation, the first relay (and/or the second relay) may be an electromechanical relay or a direct current (DC) contactor, which has a large amperage rating (e.g., up to hundreds of Amps). For non-limiting examples, the electromechanical relay uses a physical moving part to electrically connect inputs and outputs terminals of the relay, and the movement of this moving part is generated using electromagnetic forces from the control signal, which may take a certain amount of time to move. The electromechanical relay may have a response time (or switching time) of about a few millisecond (ms) to tens of milliseconds, which is the time period from the time point of receiving the control signal to the time point of completing the switch. The DC contactor may have a response time of about a few millisecond (ms) to tens of milliseconds, for example, 3 ms or 5 ms. In some implementations, the first relay (and/or the second relay) may be a solid state relay, which may have a shorter response time than a typically electromechanical relay, for example, a fraction of a millisecond (e.g., 0.1 ms).

In some implementations, the input terminal of the first relay may connect to a positive terminal of the first battery, and the output terminal of the first relay may connect to a positive input of the cranking motor (and on-board accessories). The input terminal of the battery protection circuit may connect to a positive terminal of the first battery, and the output terminal of the battery protection circuit may connect to a positive input of the load (e.g., on-board accessories).

One non-limiting example shows the benefits of protecting the second battery by the various embodiments in the present disclosure. When the battery protection circuit is removed from the system and replaced by a direct electric connection, the discharge current from the second battery (e.g., a lithium battery) increases to over 400 Amps during an engine starting event, which is much higher (almost five times) than the lithium battery's maximum pulse discharge current of 80 Amps.

FIG. 2 shows another schematic diagram of one embodiment in the present disclosure. A normally-closed (N.C.) relay (252) and bypass resistors (254) are in parallel and are electrically disposed between a load (including cranking motor (262) and on-board accessories) and a battery (e.g., an AGM battery or a LFP battery) (240). A normally-open (N.O.) relay (230) is disposed between a supercapacitor pack (220) and the load. A controller (210) sends control signals to control the N.C. relay (252) and the N.O. relay (230).

In some implementations, a momentary push button switch to emergency start circuit may be added, which may serve as an input signal to the controller, for control of the N.C. relay and/or the N.O. relay.

In some implementation, opening the N.C. relay at the EFB, the AGM battery, or the LFP battery prevents energy of the supercapacitor pack from transferring to the EFB, the AGM battery, or the LFP battery.

In some implementation, the controller may close the N.O. relay (e.g., a DC contactor) when a starter motor terminal circuit is live. In some implementations, simultaneously, a same signal (280) for closing the N.O. relay (230) may be sent by the controller to the N.C. relay (252) for opening the N.C. relay.

In some implementations, the bypass resistor (254) may be only active, providing essential current to on-board accessories (e.g., including the electrical system) during engine starting events, which are typically about a fraction or a few seconds long (e.g., 0.5, 1, 2, or 5 seconds).

Figure 3:
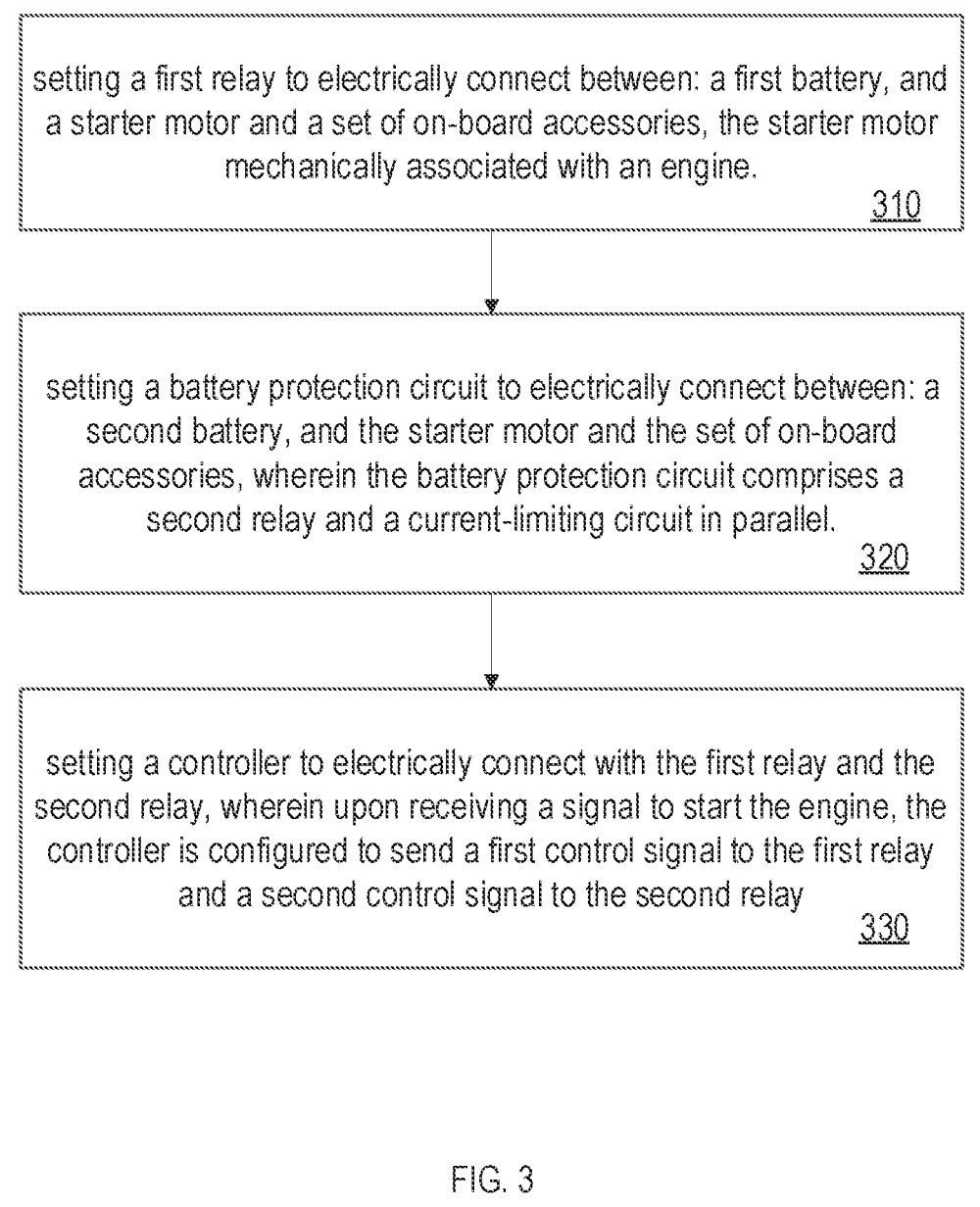

The present disclosure also describes a method for manufacturing a battery protection circuit. The method may include one or more of the following steps, as shown in FIG. 3. The battery protection circuit may be any embodiment/implementation described above or a combination of any portion of one or more of the embodiments/implementations described above.

Step 310: setting a first relay to electrically connect between: a first battery, and a starter motor and a set of on-board accessories, the starter motor mechanically associated with an engine.

Step 320: setting a battery protection circuit to electrically connect between: a second battery, and the starter motor and the set of on-board accessories, wherein the battery protection circuit comprises a second relay and a current-limiting circuit in parallel.

Step 330: setting a controller to electrically connect with the first relay and the second relay, wherein upon receiving a signal to start the engine, the controller is configured to send a first control signal to the first relay and a second control signal to the second relay.

In any one or any combination of the implementations/embodiments described in the present disclosure, the first battery comprises a super-capacitor battery.

In any one or any combination of the implementations/embodiments described in the present disclosure, the second battery comprises a lead-acid battery, an EFB, an AGM battery, or a lithium battery.

In any one or any combination of the implementations/embodiments described in the present disclosure, the first relay is a normally-open relay.

In any one or any combination of the implementations/embodiments described in the present disclosure, upon receiving the first control signal from the controller, the first relay is configured to switch from an open state to a closed state, so that the first battery supplies electric power to the starter motor to start the engine.

In any one or any combination of the implementations/embodiments described in the present disclosure, the first relay comprises an input terminal, an output terminal, and a control terminal; the input terminal of the first relay electrically connects to a positive terminal of the first battery; the output terminal of the first relay electrically connects to positive terminals of the starter motor and the set of on-board accessories; and/or the control terminal of the first relay electrically connects to the controller.

In any one or any combination of the implementations/embodiments described in the present disclosure, the second relay is a normally-closed relay.

In any one or any combination of the implementations/embodiments described in the present disclosure, before receiving the second control signal from the controller, the second relay is in a closed state, so that the second battery supplies electric power to the set of on-board accessories via the second relay; and/or upon receiving the second control signal from the controller, the second relay is configured to switch from the closed state to an open state, so that the second battery supplies electric power to the set of on-board accessories via the current-limiting circuit.

In any one or any combination of the implementations/embodiments described in the present disclosure, the second relay comprises an input terminal, an output terminal, and a control terminal; the input terminal of the second relay electrically connects to a positive terminal of the second battery; the output terminal of the second relay electrically connects to positive terminals of the starter motor and the set of on-board accessories; and/or the control terminal of the second relay electrically connects to the controller.

In any one or any combination of the implementations/embodiments described in the present disclosure, the current-limiting circuit comprises any type of electric components capable of restricting/limiting electric current, for example, a resistor, or a pulse width modulation (PWM) metal-oxide-semiconductor field-effect transistor (MOS- FET). The PWM MOSFET may have an equivalent resistance value with respect to restricting/limiting electric current.

In any one or any combination of the implementations/ embodiments described in the present disclosure, a resistance value of the resistor or the PWM MOSFET is determined based on a nominal voltage and a maximum discharge current of the second battery.

In any one or any combination of the implementations/ embodiments described in the present disclosure, the resistor or the PWM MOSFET has a resistance value between 0.01 Ohm and 25 Ohm, inclusive.

In any one or any combination of the implementations/ embodiments described in the present disclosure, the first control signal and the second control signal is a same signal.

In some other embodiments, referring to FIGS. 4A and 4B, a capacitor 182 may be included in a circuit. One end of the capacitor 182 may be electrically connected to the first relay 130 and the second relay 152; and the other end of the capacitor may be electrically grounded (shown as 184). In some implementations, the ground 184 may be provided by connecting to the chassis of the vehicle or vessel.

In some implementations as shows in FIG. 4B, the protection circuit may include the current limiting circuit being parallel with the second relay. In some implementations as shown in FIG. 4A, the protection circuit may only include the second relay and may not include the current limiting circuit being parallel with the second relay.

In some implementations, the capacitor may be charged by the second battery when the second relay is in closed state. When the second relay is turned to open state, the capacitor that was charged may discharge to provide electric power to on-board accessories, which may not be affected by the disconnection of the second battery.

In some implementations, during an engine starting event, the controller may send out the second control signal for switching the second relay from a closed state to an open state a short duration earlier than the first control signal for switching the first relay from an open state to a closed state. The short duration may be as long as hundreds of millisecond and/or tens of millisecond, or as short as a few millisecond (for example, 3 ms or 5 ms). During this duration (including transitional switching period), the capacitor may discharge to provide the necessary electric power to the on-board electronics/accessories, so that the on-board electronics/accessories do not lose power and continue their normal functions.

In some implementations, a first control signal for switching the first relay from an open state to a closed state may be same (or may have same timing) as a second control signal for switching the second relay from a close state to an open state. During a short transitional switching period due to the switching time/delay of the first relay and the second relay (e.g., as short as 3 ms or as long as 100 ms), the capacitor may discharge to provide the necessary electric power to the on-board electronics/accessories, so that the on-board electronics/accessories do not lose power and continue their normal functions.

In various embodiments in the present disclosure, it may be important to provide uninterrupted (continuously) electrical power to engine and transmission engine control modules (ECMs), so as to keep the engine and transmission ECMs alive without any interruption during a short transitional switching period. In some implementations, an electrical energy capacity of the capacitor 182 may be determined based on keeping the ECMs and/or the other electronics and accessories powered and functioning normally during the short transitional switching period. In some implementations when the capacitor 182 does not have enough electrical power (e.g., due to its small capacity for saving cost, performance degradation due to aging, not-fully charged, etc.), although it's desirable to keep the other electronics and accessories powered and functioning normally, they may be sacrificed or electrically isolated so that electrical energy from the capacitor is sufficiently available to power ECMs during the short transitional switching period, before the first or second battery kicks in.

In some implementations, the capacitor may be a high capacitance capacitor, which is designed for power supply filters and/or energy storage application.

The present disclosure also describes a method for manufacturing a circuit, which may be used during an engine starting event in a vessel. The method may include a portion or all of the following steps, as shown in FIG. 5. The protection circuit may be any embodiment/implementation described above or a combination of any portion of one or more of the embodiments/implementations described above.

Step 510: setting a first relay to electrically connect between: a first battery, and a starter motor and a set of on-board accessories, the starter motor mechanically associated with an engine.

Step 520: setting a battery protection circuit to electrically connect between: a second battery, and the starter motor and the set of on-board accessories, wherein the battery protection circuit comprises a second relay.

Step 530: setting one terminal of a capacitor to electrically connect with the second relay and the set of on-board accessories, and another terminal of the capacitor to be grounded.

Step 540: setting a controller to electrically connect with the first relay and the second relay, wherein upon receiving a signal to start the engine, the controller is configured to send a first control signal to the first relay and a second control signal to the second relay.

In the embodiments and implementation of this disclosure, any steps, components, and/or operations may be combined or arranged in any amount or order, as desired. Two or more of the steps and/or operations may be performed in parallel. Embodiments and implementations in the disclosure may be used separately or combined in any order.

While the present disclosure has been described with reference to illustrative embodiments, this description is not meant to be limiting. Various modifications of the illustrative embodiments and additional embodiments of the present disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A system for providing a protection circuit during an engine starting event, the system comprising:
   a first relay, wherein the first relay electrically connects between:
   a first battery, and
   a starter motor and a set of on-board accessories, the starter motor mechanically associated with an engine;

a battery protection circuit, wherein the battery protection circuit comprises a second relay, and electrically connects between:

a second battery, and the starter motor and the set of on-board accessories;

a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay, wherein upon receiving the first control signal from the controller, the first relay is configured to switch from an open state to a closed state, so that the first battery supplies electric power to the starter motor to start the engine.

2. The system according to claim 1, wherein the second battery comprises one of a lead-acid battery, an enhanced flooded battery (EFB), an absorbent glass mat (AGM) battery, or a lithium battery.

3. The system according to claim 1, wherein the first relay is a normally-open relay.

4. The system according to claim 1, wherein: the first relay comprises an input terminal, an output terminal, and a control terminal; the input terminal of the first relay is configured to electrically connect to a positive terminal of the first battery; the output terminal of the first relay is configured to electrically connect to positive terminals of the starter motor and the set of on-board accessories; and the control terminal of the first relay is configured to electrically connect to the controller.

5. The system according to claim 1, wherein: the second relay comprises an input terminal, an output terminal, and a control terminal; the input terminal of the second relay is configured to electrically connect to a positive terminal of the second battery; the output terminal of the second relay is configured to electrically connect to positive terminals of the starter motor, the set of on-board accessories, and the capacitor; and the control terminal of the second relay is configured to electrically connect to the controller.

6. The system according to claim 1, wherein the first battery comprises the capacitor.

7. A system for providing a protection circuit during an engine starting event, the system comprising:

a first relay, wherein the first relay electrically connects between:

a first battery comprising a super-capacitor battery, and a starter motor and a set of on-board accessories, the starter motor mechanically associated with an engine;

a battery protection circuit, wherein the battery protection circuit comprises a second relay, and electrically connects between:

a second battery, and the starter motor and the set of on-board accessories;

a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay.

8. A system for providing a protection circuit during an engine starting event, the system comprising:

a first relay, wherein the first relay electrically connects between:

a first battery, and a starter motor and a set of on-board accessories, the starter motor mechanically associated with an engine;

a battery protection circuit, wherein the battery protection circuit comprises a second relay, and electrically connects between:

a second battery, and the starter motor and the set of on-board accessories;

a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay, wherein the second relay is a normally-closed relay.

9. A system for providing a protection circuit during an engine starting event, the system comprising:

a first relay, wherein the first relay electrically connects between:

a first battery, and a starter motor and a set of on-board accessories, the starter motor mechanically associated with an engine;

a battery protection circuit, wherein the battery protection circuit comprises a second relay, and electrically connects between:

a second battery, and the starter motor and the set of on-board accessories;

a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay, wherein: before receiving the second control signal from the controller, the second relay is in a closed state, so that the second battery supplies electric power to the set of on-board accessories and charges the capacitor via the second relay; and upon receiving the second control signal from the controller, the second relay is configured to switch from the closed state to an open state, and the capacitor is configured to supply electric power to the set of on-board accessories.

10. A system for providing a protection circuit during an engine starting event, the system comprising:

a first relay, wherein the first relay electrically connects between:

a first battery, and a starter motor and a set of on-board accessories, the starter motor mechanically associated with an engine;

a battery protection circuit, wherein the battery protection circuit comprises a second relay, and a current-limiting circuit being in parallel with the second relay, and the current-limiting circuit comprises a resistor or a pulse width modulation (PWM) metal-oxide-semiconductor field-effect transistor (MOSFET), wherein the battery protection circuit electrically connects between:

a second battery, and the starter motor and the set of on-board accessories;

a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay.

11. The system according to claim 10, wherein a resistance value of the resistor or the PWM MOSFET is determined based on a nominal voltage and a maximum discharge current of the second battery.

12. The system according to claim 10, wherein the resistor or the PWM MOSFET has a resistance value between 0.01 Ohm and 25 Ohm, inclusive.

13. A system for providing a protection circuit during an engine starting event, the system comprising:

a first relay, wherein the first relay electrically connects between:

a first battery, and a starter motor and a set of on-board accessories, the starter motor mechanically associated with an engine;

a battery protection circuit, wherein the battery protection circuit comprises a second relay, and electrically connects between:

a second battery, and the starter motor and the set of on-board accessories;

a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay, wherein the first control signal and the second control signal is a same signal.

14. A system for starting an engine, the system comprising:

a first battery;

a second battery;

a first relay, wherein the first relay electrically connects between: the first battery, and a starter motor and a set of on-board accessories, the starter motor mechanically associated with an engine;

a battery protection circuit, wherein the battery protection circuit comprises a second relay, and electrically connects between:

the second battery, and the starter motor and the set of on-board accessories;

a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay, wherein upon receiving the first control signal from the controller, the first relay is configured to switch from an open state to a closed state, so that the first battery supplies electric power to the starter motor to start the engine.

15. The system according to claim 14, wherein the first battery comprises a super-capacitor battery.

16. The system according to claim 14, wherein the second battery comprises one of a lead-acid battery, an enhanced flooded battery (EFB), an absorbent glass mat (AGM) battery, or a lithium battery.

17. The system according to claim 14, wherein the first relay is a normally-open relay.

18. The system according to claim 14, wherein the first battery comprises the capacitor.

19. A system for starting an engine, the system comprising:

a first battery;

a second battery;

a first relay, wherein the first relay electrically connects between: the first battery, and a starter motor and a set of on-board accessories, the starter motor mechanically associated with an engine;

a battery protection circuit, wherein the battery protection circuit comprises a second relay, and electrically connects between:

the second battery, and the starter motor and the set of on-board accessories;

a capacitor, wherein a first terminal of the capacitor is configured to electrically connect with the second relay and the set of on-board accessories, and a second terminal of the capacitor is configured to be grounded; and a controller, wherein upon receiving a signal to start the engine, the controller is configured to send a first control signal to the first relay and a second control signal to the second relay, wherein: before receiving the second control signal from the controller, the second relay is in a closed state, so that the second battery supplies electric power to the set of on-board accessories and charges the capacitor via the second relay; and upon receiving the second control signal from the controller, the second relay is configured to switch from the closed state to an open state, and the capacitor is configured to supply electric power to the set of on-board accessories.

20. A method of manufacturing a circuit, the method comprising:

setting a first relay to electrically connect between:

a first battery, and a starter motor and a set of on-board accessories, the starter motor mechanically associated with an engine;

setting a battery protection circuit to electrically connect between:

a second battery, and the starter motor and the set of on-board accessories, wherein the battery protection circuit comprises a second relay;

setting one terminal of a capacitor to electrically connect with the second relay and the set of on-board accessories, and another terminal of the capacitor to be grounded; and setting a controller to electrically connect with the first relay and the second relay, wherein upon receiving a signal to start the engine, the controller is configured to send a first control signal to the first relay and a second control signal to the second relay, wherein upon receiving the first control signal from the controller, switching the first relay from an open state to a closed state, and supplying electric power to the starter motor from the first battery to start the engine.

21. The method according to claim 20, wherein the first battery comprises the capacitor.

* * * * *